United States Patent
Zhou

(10) Patent No.: US 8,385,509 B2
(45) Date of Patent: Feb. 26, 2013

(54) METHOD AND SYSTEM FOR EXTENDING TRANSMISSION DISTANCE OF ADSL SIGNAL

(75) Inventor: Jun Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1572 days.

(21) Appl. No.: 11/851,654

(22) Filed: Sep. 7, 2007

(65) Prior Publication Data

US 2008/0212614 A1    Sep. 4, 2008

Related U.S. Application Data

(63) Continuation of application No. PCT/CN2006/000362, filed on Mar. 10, 2006.

(30) Foreign Application Priority Data

Mar. 10, 2005    (CN) .......................... 2005 1 0053681

(51) Int. Cl.
  *H04M 1/24* (2006.01)
  *H04M 3/08* (2006.01)
  *H04M 3/22* (2006.01)

(52) U.S. Cl. .......................... 379/1.04; 379/24; 375/222

(58) Field of Classification Search ............... 379/1.01, 379/1.03, 1.04, 9, 22, 22.02, 32.01, 32.02, 379/388.06, 400, 404, 24; 375/222, 225
See application file for complete search history.

(56) References Cited

U.S. PATENT DOCUMENTS

| | | |
|---|---|---|
| 6,628,754 B1 | 9/2003 | Murphy et al. |
| 6,650,697 B1 * | 11/2003 | Tate et al. ................... 375/222 |
| 6,690,768 B2 | 2/2004 | Hansen |
| 6,721,394 B1 | 4/2004 | Murphy et al. |
| 7,072,449 B2 * | 7/2006 | Tomilson ................ 379/27.01 |
| 2003/0099286 A1 * | 5/2003 | Graziano et al. ............. 375/222 |
| 2003/0108191 A1 | 6/2003 | Kerpez |
| 2003/0202570 A1 * | 10/2003 | Bella et al. .................... 375/222 |
| 2004/0037216 A1 | 2/2004 | Redfern |
| 2004/0057564 A1 * | 3/2004 | Rappaport et al. ......... 379/93.01 |
| 2004/0196912 A1 | 10/2004 | Del Toso et al. |
| 2005/0025086 A1 * | 2/2005 | Noma et al. .................. 370/318 |

(Continued)

FOREIGN PATENT DOCUMENTS

CN    1489860 A    4/2004
EP    1 385 309 A2    1/2004

(Continued)

OTHER PUBLICATIONS

Written Opinion of the International Searching Authority in corresponding PCT Application No. PCT/CN2006/000362 (May 18, 2006).

(Continued)

*Primary Examiner* — Binh Tieu
(74) *Attorney, Agent, or Firm* — Leydig, Voit & Mayer, Ltd.

(57) ABSTRACT

A method for extending transmission distance of an ADSL signal includes: increasing power spectral density (PSD) of an ADSL signal when a parameter of the ADSL signal is equal to or greater than a preset threshold; and sending the ADSL signal with the increased PSD. A system for extending transmission distance of ADSL signal includes a PSD adjustment determining unit, a PSD adjusting unit and a transmitting unit. A method for promoting transmission rate of an ADSL signal is disclosed as well. The solution extends the coverage of the ADSL signal, and when the CO increases the downlink PSD, the CEP need not to be modified, which reduces the cost.

31 Claims, 3 Drawing Sheets

U.S. PATENT DOCUMENTS

| | | | |
|---|---|---|---|
| 2005/0031027 A1* | 2/2005 | Noma et al. | 375/222 |
| 2005/0041799 A1* | 2/2005 | Pythoud et al. | 379/400 |
| 2005/0105602 A1 | 5/2005 | Peeters et al. | |
| 2005/0123028 A1* | 6/2005 | Cioffi et al. | 375/222 |
| 2005/0152442 A1* | 7/2005 | Duvaut et al. | 375/222 |
| 2005/0220178 A1* | 10/2005 | Ginis | 375/219 |
| 2005/0220179 A1* | 10/2005 | Tsatsanis | 375/222 |
| 2010/0246598 A1* | 9/2010 | Bremer et al. | 370/464 |

FOREIGN PATENT DOCUMENTS

| | | |
|---|---|---|
| EP | 1 473 896 A1 | 11/2004 |
| WO | WO 00/67385 A1 | 11/2000 |
| WO | WO 01/43415 A2 | 6/2001 |

OTHER PUBLICATIONS

International Search Report in corresponding PCT Application No. PCT/CN2006/000362 (May 18, 2006).

"G.992.1—Asymmetric digital subscriber line (ADSL) transceivers," Series G: Transmission Systems and Media, Digital Systems and Networks; Digital transmission systems—Digital sections and digital line system—Access networks, Jun. 1999, International Telecommunication Union, Geneva, Switzerland.

"G.994.1—Handshake procedures for digital subscriber line (DSL) transceivers," Series G: Transmission Systems and Media, Digital Systems and Networks; Digital sections and digital line system—Access networks, Feb. 2001, International Telecommunication Union, Geneva, Switzerland.

"Draft Rec. G.992.3—ADSL2 (for consent)," Editor Rec. G.992.3, Apr. 29-May 10, 2002, International Telecommunication Union, Geneva, Switzerland.

Zhijian et al., "New members in the ADLS family," China Data Communications, 12: 10-13 (Dec. 2003).

* cited by examiner

METHOD AND SYSTEM FOR EXTENDING TRANSMISSION DISTANCE OF ADSL SIGNAL

CROSS-REFERENCE TO RELATED APPLICATIONS

This application is a continuation of International Patent Application No. PCT/CN2006/000362 filed on Mar. 10, 2006. This application claims the benefit and priority of Chinese Patent Application No. 200510053681.9, filed on Mar. 10, 2005. The entire disclosures of each of the above applications is incorporated herein by reference.

FIELD OF THE INVENTION

The present invention relates to a network communication technology, and more particularly to a method and a system for extending transmission distance of ADSL signal.

BACKGROUND OF THE INVENTION

A Digital Subscriber Line (xDSL) technology is a technology that provides broadband service by utilizing existing copper wire resource. The application of the xDSL technology can effectively protect the investment of the operators and provide the broadband service of high quality to the subscriber. Consequently, the xDSL technology has been briskly developed throughout the world since it is known. The data rate on the downlink from the Central Office (CO) to the Customer Premise Equipment (CPE) is much greater than that on the uplink from the CPE to the CO by utilizing the Asymmetric Digital Subscriber Line (ADSL) technology in the xDSL, which is suitable for the asymmetric feature of data traffic of residential broadband access service. Therefore, the ADSL technology is prevailing in residential broadband access application.

The frequency used by the ADSL is much higher than that of the conventional telephone signal. The frequency band of the ADSL is 25.875 kHz-1104 kHz. The frequency band of ADSL2+ is 25.875 kHz-2208 kHz. Because the ADSL and the Plain Old Telephone Service (POTS) occupy different frequency bands, they may transmit on a same telephone line simultaneously and may be separated by a simple splitter at the receiving and transmitting sides. A device for providing a centralized multiple ADSL services is called DSL Access Multiplexer (DSLAM).

The coverage of common ADSL signals is about 5 km (18 kft). The link between the CO and the CPE can not be established because of the attenuation of the ADSL signals in the downlink when the loop goes beyond 5 km, thereby influencing the popularization of the ADSL. Consequently, the DSLAM is generally moved down to be closer to the subscribers, which may greatly increase the operational cost of the operators. In order to extend the coverage of the ADSL signals, two solutions are given in the prior art.

One solution is that the Reach Extended ADSL2 (READSL2), i.e., ADSL2 annex L, is proposed in ADSL2 for providing ADSL service on a long loop, and the coverage of the ADSL signals is extended up to 22 kft. However, READSL2 requires that equipment at both sides of the communication support ADSL2, millions of existing ADSL lines cannot be used for the long loop of the ADSL by adopting READSL2.

The other solution is that the coverage of the ADSL signals is extended by some subscribers based on proprietary protocols. For example, the frequency band of 25 kHz-138 kHz is used for the downlink transmission by adopting an echo cancellation (EC) method. The coverage of the ADSL signals is extended substantially owing to the less attenuation of the low-frequency signal. However, the proprietary protocol can't be interoperable with a common modem using Frequency-Division Multiplexing (FDM) mode. If EC method is applied to the environment with high service penetration rate, the achievable data rate or reach may be degraded dramatically due to the serious near end crosstalk.

SUMMARY OF THE INVENTION

The present invention provides a method and a system for extending transmission distance of an ADSL signal.

A method for extending transmission distance of an ADSL signal includes: increasing power spectral density (PSD) of an ADSL signal when a parameter of the ADSL signal is equal to or greater than a preset threshold; and sending the ADSL signal with the increased PSD.

A system for extending transmission distance of an Asymmetric Digital Subscriber Line (ADSL) signal, includes a power spectral density (PSD) adjustment determining unit, a PSD adjusting unit and a transmitting unit; in which the PSD adjustment determining unit is configured to send a PSD adjusting notification to the PSD adjusting unit when a parameter of an ADSL signal is equal to or greater than a preset threshold; the PSD adjusting unit is configured to increase the PSD of the ADSL signal in response to receiving the PSD adjusting notification, and send the increased PSD to a transmitting unit; and the transmitting unit is configured to send the ADSL signal with the increased PSD sent by the PSD adjusting unit.

A method for promoting transmission rate of an Asymmetric Digital Subscriber Line (ADSL) signal includes: increasing power spectral density (PSD) of an ADSL signal when a parameter of the ADSL is equal to or greater than a preset threshold; and sending the ADSL signal with the increased PSD.

Compared with the prior art, the present invention extends the coverage of an ADSL signal by increasing the downlink PSD of the ADSL signal by the CO or increasing the uplink PSD of the ADSL signal by the CPE. No modification is needed on the CEP when the CO increases the downlink PSD of the ADSL signals, which reduces cost of the solution.

DETAILED DESCRIPTION OF THE INVENTION

In accordance with ADSL recommendation, the downlink frequency band of a common ADSL signal is 138 kHz-104 kHz. The nominal power spectral density (PSD) of the common ADSL is −36.5 dBm/Hz. In ADSL2 annex L, the coverage of ADSL signals is extended by adopting a method for increasing the uplink and downlink PSD. The available frequency band becomes 138 kHz-552 kHz from the range of 138 kHz-1104 kHz in ADSL annex A in order to comply with requirement of the total power being constant according to spectrum management specifications such as T1.417 of American National Standards Institute (ANSI). In the present invention, the transmission distance of ADSL signals is extended by increasing the PSD of the ADSL signals. Moreover, the frequency bandwidth of the ADSL signal is reduced while the PSD is increased, such that the total power is constant according to spectrum management specifications.

According to the present invention, there are three solutions to extend the transmission distance of ADSL signals. The first is achieved by increasing the downlink PSD of ADSL signals. The second is achieved by increasing the uplink PSD of ADSL signals. The last one is achieved by increasing both the uplink and downlink PSD of ADSL signals simultaneously. Specifically, the increasing of the uplink PSD and/or the downlink PSD of ADSL signals can be initiated by CO or by CPE.

Figure 1:
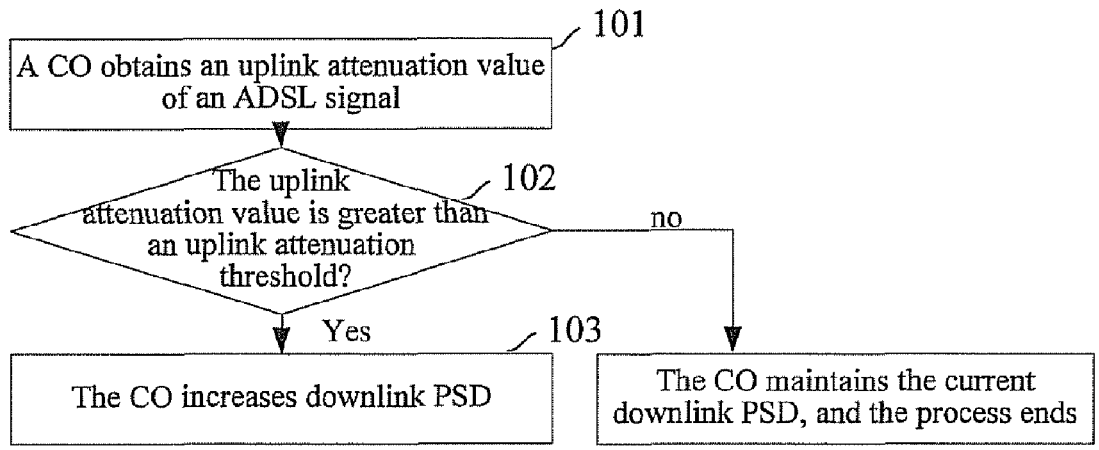
FIG. 1 is a flowchart showing the process initiated by a CO for extending downlink transmission distance of an ADSL signal according to the present invention.

FIG. 1 is the flowchart showing the process initiated by a CO for extending downlink transmission distance of an ADSL signal according to the present invention. As illustrated in FIG. 1, the detailed process is as follows.

Block 101, A CO obtains an uplink attenuation value of an ADSL signal.

The CO obtains the uplink attenuation value of the ADSL signal by the following two methods.

Method 1: The CO obtains the uplink attenuation value of the ADSL signal according to the power of a Ghs signal, i.e., International Telecommunications Union Telecommunication Standardization Sector (ITU-T) G.944.1 signal, sent by a CPE. An uplink attenuation threshold can be preset to be about 36 dB. ADSL2 signal is generally switched to a PSD mask of ADSL2 annex L when the loop length goes beyond 4 km. Accordingly, in the present invention, the loop length of about 4 km is taken as the switching point of the PSD mask. 4 km is taken as an example hereafter. The CO can't determine when to perform the switching without knowing the loop length. In the present invention, the loop length can be determined according to the uplink attenuation value of the uplink ADSL signal. For example, the uplink attenuation value per kilometer is about 9 dB, and accordingly, the PSD mask can be switched when the uplink attenuation value equals to 36 dB. So that 36 dB can be selected as the preset uplink attenuation threshold.

Method 2: The CO obtains the uplink attenuation value of the ADSL signal according to the received power on sub-carriers (tones) such as the sub-carriers 7~18 sent by the CPE during R-reverb1 in a training stage of the ADSL.

The CO obtains the uplink attenuation value by comparing the power of the sub-carriers sent by the CPE on selected sub-carriers with the nominal power received by the CO on the sub-carriers. In general, when the power of the sub-carriers 7~18 received by the CO is 9.14 dBm, the loop length is zero. And the loop length exceeds the preset loop length 4 km when the power of the sub-carriers 7~18 is −26.8 dBm. Consequently, the uplink attenuation value corresponding to the power −26.8 dBm of the sub-carriers 7~18 is preset as the uplink attenuation threshold.

Block 102: The CO determines whether the uplink attenuation value of the current ADSL signal is greater than the uplink attenuation threshold. If the uplink attenuation value of the current ADSL signal is greater than the uplink attenuation threshold, this means that the loop length is greater than a preset loop length threshold, and go to Block 103. Otherwise, the CO maintains the current downlink PSD, and the process ends.

Block 103: The CO increases the downlink PSD and sends the downlink ADSL signal with the increased downlink PSD.

Specifically, the CO switches to the PSD mask of ADSL2 annex L from the current PSD mask, and sends the downlink ADSL signal with the downlink PSD and the downlink frequency bandwidth in the PSD mask of ADSL2 annex L. Preferably, the PSD can be increased smoothly in block 103, for example, the uplink and downlink non-overlapping frequency spectrum, i.e. the Frequency-Division Multiplexing (FDM) mode is adopted. Accordingly, the increased downlink PSD can be calculated based on the following formula.

The increased downlink PSD$\leq Pd\text{max}-(30+10 \lg(f-138))+3.5$ dBm; where

Pdmax is the maximal total downlink transmission power in dBm, e.g. Pdmax is 19.9 dBm according to the ADSL standard; f is a downlink cutoff frequency, and in the present invention, f may equal to 552 kHz, f may also be lower than 552 kHz if not constrained by spectrum management specifications; Pdmax$-(30+10 \lg (f-138))$ is the new nominal downlink PSD; and 3.5 dB is the maximal tolerant pass-band ripple of a transmitter.

Further, if the spectrum management specifications require that the total power be constant even if the PSD is increased, the downlink frequency bandwidth is reduced simultaneously in block 103.

Further, after determining that uplink attenuation value of the ADSL signal is greater than the uplink attenuation threshold in block 102, the CO receives a parameter sent by the CPE, the CO modifies the parameter according to the original and the increased PSD and then reports the modified parameter to a network management unit. If the CO increases the downlink PSD and does not notify the CPE that the downlink PSD is increased, the CPE may calculate the parameter, mainly including the downlink attenuation value, to be reported to the CO according to the known downlink PSD mask (such as a nominal PSD mask specified by recommendation) used by the CO previously. For example, the parameter such as the downlink attenuation value is modified in the following manner that the increment of the downlink PSD is added to the downlink attenuation value reported by the CPE. For example, if the downlink PSD of the ADSL signal is increased by 3 dB, the downlink attenuation value reported by the CPE is increased by 3 dB before it is reported to the network management unit.

Further, after determining that downlink attenuation value of the ADSL signal is greater than the downlink attenuation threshold in block 102, the CO sends a notification to the CPE, indicating that the downlink PSD is increased. The CPE determines whether to increase the uplink PSD in response to receiving the notification. If the uplink PSD is to be increased, the CPE increases the uplink PSD. Specifically, the CO notifies the CPE that the CO has switched the downlink PSD mask to the PSD mask of ADSL2 annex L. Then the CPE switches the uplink PSD mask to the PSD mask of ADSL2 annex L. Furthermore, while increasing the uplink PSD, the CPE notifies the CO that the uplink PSD is increased. The CO reports the parameter sent by the CPE to the network management unit directly without modifying the parameter.

Figure 2:
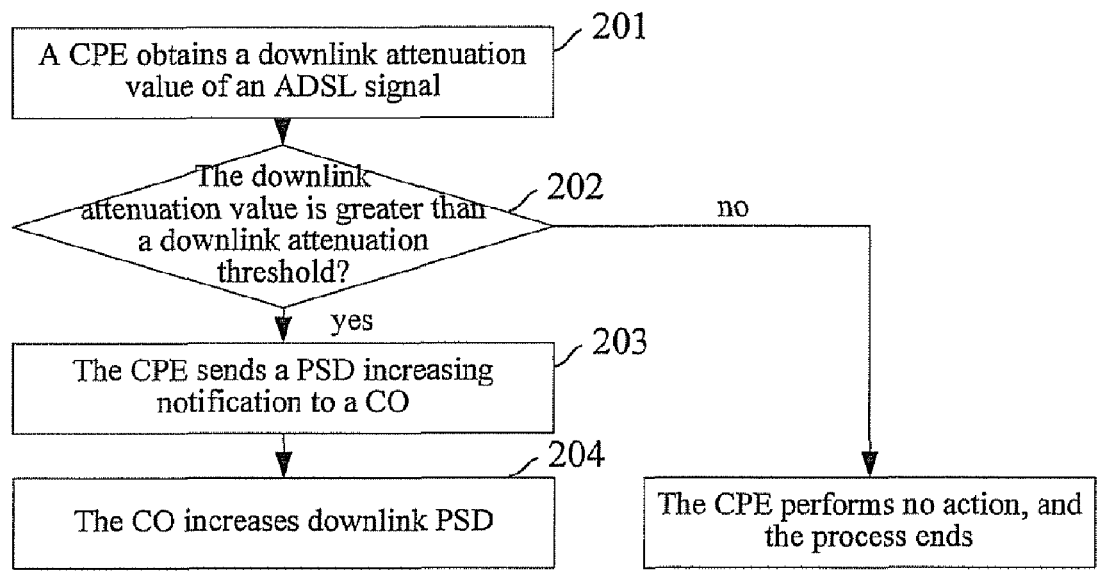
FIG. 2 is a flowchart showing the process initiated by a CPE for extending downlink transmission distance of an ADSL signal according to the present invention.

FIG. 2 is the flowchart showing the process initiated by a CPE for extending downlink transmission distance of an ADSL signal according to the present invention. As illustrated in FIG. 2, the detailed process is as follows.

Block 201: The CPE obtains a downlink attenuation value of the ADSL signal.

The CPE may obtain the downlink attenuation value of the ADSL signal by means of the following two methods.

Method 1: The CPE obtains the downlink attenuation value of the ADSL signal according to the power of the G.hs signal sent by a CO.

Method 2: The CPE obtains the downlink attenuation value of the ADSL signal according to the power of sub-carriers (tones) such as the sub-carriers 32~255 sent by the CO during C-reverb1 in training. The CPE obtains the downlink attenuation value by comparing the power of the sub-carriers sent by the CO with the nominal power of the sub-carriers.

Block 202: The CPE determines whether the downlink attenuation value of the current ADSL signal is greater than the downlink attenuation threshold. If the downlink attenuation value of the current ADSL signal is greater than the downlink attenuation threshold, the CPE determines that the loop length of the current ADSL exceeds a preset loop length threshold, and go to block 203. Otherwise, the CPE performs no action, and the process ends.

Block 203: The CPE sends a PSD increasing notification message to the CO.

Block 204: In response to receiving the PSD increasing notification message, the CO increases the PSD and sends a downlink ADSL signal with the increased downlink PSD.

Further, if the spectrum management specifications require that the total power be constant even if the PSD is increased, the CO reduces the downlink frequency bandwidth in block 204.

Further, after increasing the downlink PSD in Block 204, if the CO receives a parameter sent by the CPE, the CO modifies the parameter according to the original and the increased downlink PSD and reports the modified parameter to the network management unit.

Further, after determining that the downlink attenuation value of the ADSL signal is greater than the downlink attenuation threshold in block 202, the CPE determines whether to increase the uplink PSD. If the uplink PSD is to be increased, the CPE increases the uplink PSD and simultaneously sends a notification to the CO, indicating that the uplink PSD is increased. Furthermore, in response to obtaining that the uplink PSD is increased, the CO reports the parameter sent by the CPE to the network management unit directly without modifying the parameter.

Figure 3:
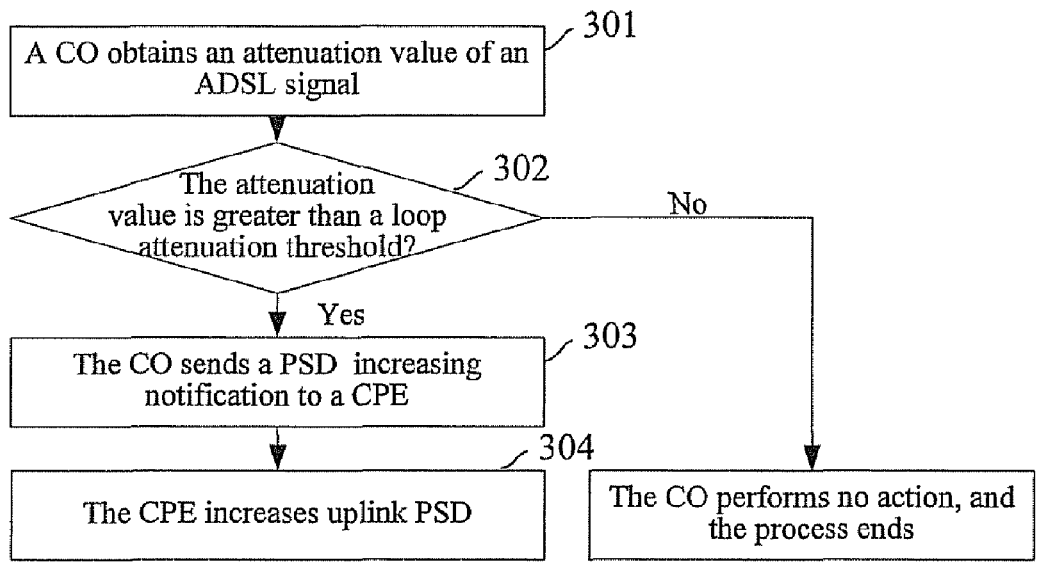
FIG. 3 is a flowchart showing the process initiated by a CO for extending uplink signal transmission distance of an ADSL signal according to the present invention.

FIG. 3 is the flowchart showing the process initiated by a CO for extending uplink transmission distance of an ADSL signal according to the present invention. As illustrated in FIG. 3, the detailed process is as follows.

Block 301: The CO obtains a loop attenuation value of the ADSL signal.

The CO may only obtain the uplink attenuation value of the ADSL signal, or obtain both the uplink and downlink attenuation values of the ADSL signal. The CO obtains the uplink attenuation value in a manner similar with that in block 102. A CPE may report the downlink attenuation value to the CO periodically (or according to inquiring commands of the CO). The CPE obtains the downlink attenuation value in a manner similar with that in block 202.

Block 302: The CO determines whether the loop attenuation value of the current ADSL signal is greater than an attenuation threshold. If the loop attenuation value of the current ADSL signal is greater than the attenuation threshold, go to block 303. Otherwise, the CO performs no action, and the process ends.

The attenuation threshold may be an uplink attenuation threshold, or a difference between an uplink attenuation threshold and a downlink attenuation threshold. If the CO obtains the uplink attenuation value of the ADSL signal in block 301, the CO determines whether the uplink attenuation value of the current ADSL signal is greater than the uplink attenuation threshold in block 302. If the CO obtains both the uplink and downlink attenuation values of the ADSL signal simultaneously in block 301, the CO determines whether the difference between the uplink and downlink attenuation values of the current ADSL signal is greater than the difference between the uplink and downlink attenuation threshold in block 302.

Block 303: The CO sends a PSD increasing notification message to the CPE.

Block 304: In response to receiving the PSD increasing notification message, the CPE increases the current uplink PSD and sends the uplink ADSL signal with the increased uplink PSD.

Specifically, the CPE switches the current PSD mask to the PSD mask of ADSL2 annex L, and sends the uplink ADSL signal with the uplink PSD and the uplink frequency bandwidth in the PSD mask of ADSL2 annex L. Preferably, the uplink PSD can be increased smoothly in block 304. For example, when the uplink and downlink non-overlapping frequency spectrum is adopted, the increased uplink PSD can be calculated based on the following formula.

$$\text{The increased uplink PSD} \leq P u \text{max} - (30 + 10 \lg(f - 25.875)) + 3.5 \text{ dBm; where}$$

Pumax is the maximal total uplink transmission power in dBm, e.g. Pumax is 12.5 dBm according to the ADSL standard; f is an uplink cutoff frequency, and in the present invention, f may be equal to 138 kHz, f may also be higher than 138 kHz if not constrained by spectrum management specifications; $Pumax-(30+10 \lg(f-25.875))$ is the nominal uplink PSD; and 3.5 dB is the maximal tolerant pass-band ripple of the transmitter.

Further, if the spectrum management specifications require that the total power be constant even if the PSD is increased, the CPE reduces the uplink frequency bandwidth in this block.

Further, after increasing the uplink PSD in block 304, the CPE notifies the CO that the uplink PSD is increased.

Further, after determining that the loop attenuation value of the ADSL signal is greater than the attenuation threshold in block 302, the CO determines whether to increase the downlink PSD. If the downlink PSD is to be increased, the CO increases the downlink PSD. Specifically, the CPE notifies the CO that the CPE has switched the uplink PSD mask to the PSD mask of ADSL2 annex L. The CO switches the downlink PSD mask to the PSD mask of ADSL2 annex L.

Figure 4:
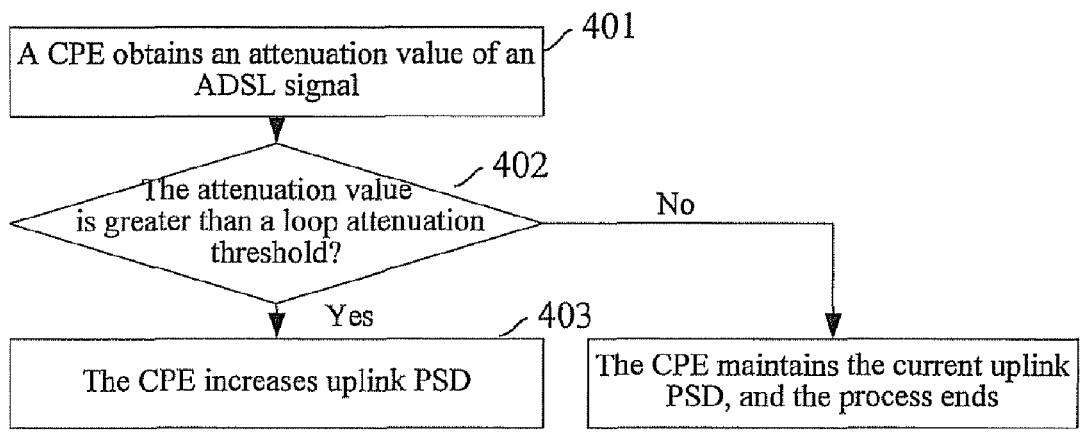
FIG. 4 is a flowchart showing the process initiated by a CPE for extending uplink signal transmission distance of an ADSL signal according to the present invention.

FIG. 4 is the flowchart showing the process initiated by a CPE for extending uplink transmission distance of an ADSL signal according to the present invention. As illustrated in FIG. 4, the detailed process is as follows.

Block 401: The CPE obtains a loop attenuation value of the ADSL signal.

The CPE may only obtain the downlink attenuation value of the ADSL signal, or obtain both the downlink and uplink attenuation values of the ADSL signal. The CPE obtains the downlink attenuation value in a manner similar with that in block 202. A CO may report the uplink attenuation value to the CPE periodically. The CO obtains the uplink attenuation value in a manner similar with that in block 102.

Block 402: The CPE determines whether the loop attenuation value of the current ADSL signal is greater than an attenuation threshold. If the loop attenuation value of the current ADSL signal is greater than the attenuation threshold, go to block 403. Otherwise, the CPE maintains the current uplink PSD, and the process ends.

The attenuation threshold may be a downlink attenuation threshold, or a difference between an uplink attenuation threshold and a downlink attenuation threshold. If the CPE obtains the downlink attenuation value of the ADSL signal in block 401, the CPE determines whether the downlink attenuation value of the current ADSL signal is greater than the downlink attenuation threshold in block 402. If the CPE obtains both the uplink and downlink attenuation values of the ADSL signal simultaneously in block 401, the CPE determines whether the difference between the uplink and downlink attenuation values of the current ADSL signal is greater than the difference between the uplink and downlink attenuation thresholds in block 402.

Block 403: The CPE increases the current uplink PSD and sends the uplink ADSL signal with the increased uplink PSD.

Specifically, the CPE switches the current uplink PSD mask to the PSD mask of ADSL2 annex L, and sends the uplink ADSL signal with the uplink PSD and the uplink frequency bandwidth in the PSD mask of ADSL2 annex L.

Further, if the spectrum management specifications require that the total power be constant even if the PSD is increased, the CPE needs to reduce the uplink frequency bandwidth in block 403.

Further, after increasing the uplink PSD in block 403, the CPE sends a notification to the CO, indicating that the uplink PSD is increased. The CO determines whether to increase the downlink PSD in response to receiving the notification. If the downlink PSD is to be increased, the CO increases the downlink PSD. Specifically, the CPE notifies the CO that the CPE has switched the uplink PSD mask to the PSD mask of ADSL2 annex L. Then the CO switches the downlink PSD mask to the PSD mask of ADSL2 annex L.

The ADSL signal described above in FIG. 1 to FIG. 4 generally refers to an ADSL signal during training or an ADSL signal during show-time. Experiments show that the coverage of the ADSL signal can be extended substantially up to about 6 km when the downlink ADSL signal is transmitted by using the method shown in FIG. 1 or 2.

When the loop length exceeds 6 km, the transmission control signal such as the Ghs signal may attenuate dramatically such that a modem can not detect the transmission control signal. Although the available connection rate of the downlink ADSL signal still exceeds 300 kbps, but the training can not be initiated, and the ADSL can not be used. According to the present invention, in order to extend the transmission distance of the ADSL signal further, the process for increasing the PSD can also be performed to the various transmission control signals by using the methods shown in FIG. 1 to FIG. 4.

In the present invention, after the PSD of the G.hs signal is increased by using the methods shown in FIG. 1 and FIG. 2, the loop length of the ADSL signal exceeds 6.41 cm, and the activation rate of the downlink ADSL signal exceeds 128 kbps.

Figure 5:
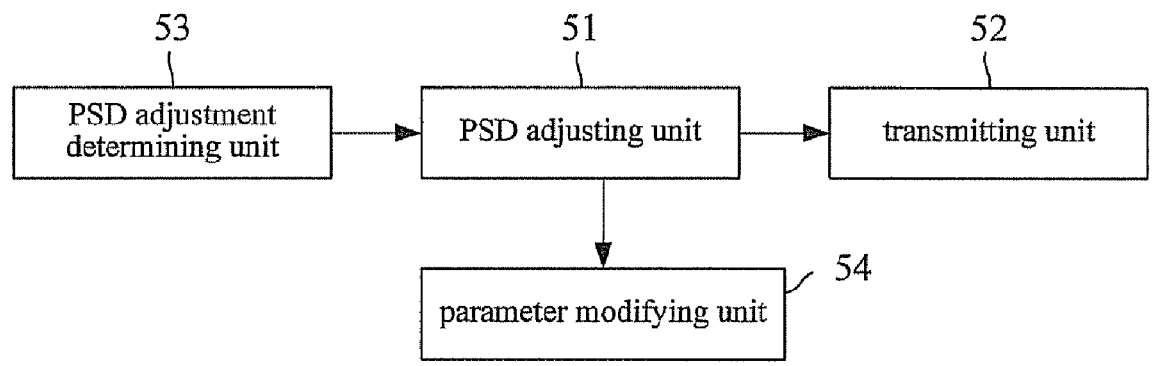
FIG. 5 is a block diagram showing a system for extending transmission distance of an ADSL signal.

To achieve the method of the present invention, the present invention also provides a system for increasing the transmission distance of an ADSL signal, as illustrated in FIG. 5, the system mainly includes PSD adjusting unit 51 and transmitting unit 52.

PSD adjusting unit 51 is used to increase PSD of an ADSL signal and reduce frequency bandwidth of the ADSL signal simultaneously, and send the increased PSD and the reduced frequency bandwidth to transmitting unit 52.

Transmitting unit 52 is used to send the ADSL signal with the increased PSD and the reduced frequency bandwidth in response to receiving the increased PSD and the reduced frequency bandwidth sent by PSD adjusting unit 51.

Both PSD adjusting unit 51 and transmitting unit 52 may be located at a CO to adjust the downlink PSD, or at a CPE to adjust the uplink PSD.

The system may further include PSD adjustment determining unit 53.

PSD adjustment determining unit 53 is used to obtain a loop attenuation value and send a PSD increasing notification to PSD adjusting unit 51 when the loop attenuation value is greater than a preset attenuation threshold.

PSD adjusting unit 51 increases the PSD of the ADSL signal in response to receiving the PSD increasing notification sent by PSD adjustment determining unit 53.

The preset attenuation threshold may be a preset uplink or downlink attenuation threshold, or both the preset uplink and downlink attenuation thresholds.

PSD adjustment determining unit 53 may be located at the CO or the CPE. When PSD adjustment determining unit 53 is located at the CO, the PSD adjusting unit 51 may be located at the CPE or the CO depending on the different uplink and downlink ADSL signals to be adjusted. When PSD adjustment adjusting unit 53 is located at the CPE, PSD adjusting unit 51 may be located at the CPE or the CO depending on the different uplink and downlink ADSL signals to be adjusted.

Further, the system may include a parameter modifying unit 54 which is used to modify a parameter according to the increased PSD sent by PSD adjusting unit 51 in response to receiving the parameter reported by the CPE, and report the modified parameter to a network management unit.

PSD adjusting unit 51 is further configured to send the increased PSD to parameter modifying unit 54.

The parameter may be the uplink or downlink attenuation value.

The parameter modifying unit 54 is located at the CO.

It is apparent that various modifications and variations may be made to the present invention by those skilled in the art, without departing from the spirit and the scope of the present invention. The present invention tends to cover the modifications and variations if those modifications and variations fall into the protected scope of the present invention defined by the accompanied claims or their equivalent.

What is claimed is:

1. A method for extending transmission distance of an Asymmetric Digital Subscriber Line (ADSL) signal, comprising: increasing power spectral density (PSD) of an ADSL signal when a parameter of the ADSL is equal to or greater than a preset threshold associated with a loop length threshold; and sending the ADSL signal with the increased PSD.

2. The method of claim 1, further comprising: reducing frequency bandwidth of the ADSL signal.

3. The method of claim 2, wherein the increased PSD is less than or equal to Pmax−(30+10 lg(f−138))+3.5, where f is a cutoff frequency, and Pmax is a maximal total transmission power.

4. The method of claim 1, further comprising: modifying the parameter of the ADSL signal according to the increment of the PSD, and reporting the modified parameter of the ADSL signal to a network management unit.

5. The method of claim 4, wherein the parameter of the ADSL is a loop attenuation value; and the modifying the parameter of the ADSL signal comprises: adding the increment of the PSD to the loop attenuation value.

6. The method of claim 1, wherein the ADSL signal comprises an ADSL signal during training or an ADSL signal during show-time.

7. The method of claim 6, wherein the ADSL signal further comprises a transmission control signal.

8. The method of claim 1, wherein the increasing PSD of an ADSL signal when a parameter of the ADSL signal is equal to or greater than a preset threshold comprises: obtaining an uplink attenuation value and a downlink attenuation value of the ADSL signal, determining the difference between the uplink attenuation value and the downlink attenuation value of the ADSL signal; and increasing the PSD of uplink ADSL signal when the difference between the uplink attenuation value and the downlink attenuation value of the ADSL signal is equal to or greater than the preset threshold.

9. The method of claim 1, wherein the increasing PSD of an ADSL signal when a parameter of the ADSL signal is equal to or greater than a preset threshold comprises: obtaining, by a CO, an uplink attenuation value of the ADSL signal; and increasing, by the CO, downlink PSD of the ADSL signal in response to determining that the uplink attenuation value of the ADSL signal is equal to or greater than a preset uplink attenuation threshold.

10. The method of claim 9, further comprising: sending, by the CO, a Customer Premise Equipment (CPE) a message containing the increment of the downlink PSD; and increasing, by the CPE, uplink PSD of the ADSL signal in response to receiving the message.

11. The method of claim 1, wherein the increasing PSD of an ADSL signal when a parameter of the ADSL signal is equal to or greater than a preset threshold comprises: obtaining, by a CO, an uplink attenuation value of the ADSL signal, sending a notification to a CPE in response to determining that the uplink attenuation value of the ADSL signal is equal to or greater than a preset uplink attenuation threshold; and increasing, by the CPE, uplink PSD of the ADSL signal in response to receiving the notification.

12. The method of claim 11, further comprising: sending, by the CPE, to the CO a notification indicating that the uplink PSD is increased; and increasing, by the CO, downlink PSD of the ADSL signal in response to receiving the notification.

13. The method of claim 1, wherein the increasing PSD of an ADSL signal comprises: obtaining, by a CPE, a downlink attenuation value of the ADSL signal; and increasing uplink PSD of the ADSL signal in response to determining that the downlink attenuation value of the ADSL signal is equal to or greater than a preset downlink attenuation threshold.

14. The method of claim 1, wherein the increasing PSD of an ADSL signal when a parameter of the ADSL signal is equal to or greater than a preset threshold comprises: obtaining, by a CPE, a downlink attenuation value of the ADSL signal, sending a notification to a CO in response to determining that the downlink attenuation value of the ADSL signal is equal to or greater than a preset downlink attenuation threshold; and increasing, by the CO, downlink PSD of the ADSL signal in response to receiving the notification.

15. A system for extending transmission distance of an Asymmetric Digital Subscriber Line (ADSL) signal, comprising a power spectral density (PSD) adjustment determining unit, a PSD adjusting unit and a transmitting unit; wherein the PSD adjustment determining unit is configured to send a PSD adjusting notification to the PSD adjusting unit when a parameter of an ADSL signal is equal to or greater than a preset threshold associated with a loop length threshold; the PSD adjusting unit is configured to increase the PSD of the ADSL signal in response to receiving the PSD adjusting notification, and send the increased PSD to a transmitting unit; and the transmitting unit is configured to send the ADSL signal with the increased PSD sent by the PSD adjusting unit.

16. The system of claim 15, wherein the PSD adjusting unit is further configured to reduce frequency bandwidth of the ADSL signal and send the reduced frequency bandwidth to the transmitting unit; the transmitting unit sends the ADSL signal with the increased PSD and the reduced frequency bandwidth sent by the PSD adjusting unit.

17. The system of claim 15, wherein both the PSD adjusting unit and the transmitting unit are located in a Central Office (CO), or a Customer Premise Equipment (CPE).

18. The system of claim 15, wherein the PSD adjustment determining unit is located in a CO, and the PSD adjusting unit is located in a CPE or in the CO.

19. The system of claim 15, wherein the PSD adjustment determining unit is located in a CPE, and the PSD adjusting unit is located in the CPE or in a CO.

20. The system of claim 15, further comprising: a parameter modifying unit, configured to modify the parameter of the ADSL signal according to the increased PSD sent by the PSD adjusting unit and report the modified parameter of the ADSL signal to a network management unit.

21. The system of claim 20, wherein the parameter modifying unit is located in a CO.

22. A method for signal transmission between a first transceiver and a second transceiver, comprising:
obtaining, at the first transceiver, a link attenuation value of a first link from the second transceiver to the first transceiver;
increasing, at the first transceiver, power spectral density (PSD) of a Digital Subscriber Line (DSL) signal on a second link from the first transceiver to the second transceiver in response to determining that the link attenuation value is equal to or greater than a preset link attenuation threshold; and
sending a message from the first transceiver to the second transceiver, the message indicating that the PSD of the DSL signal on the second link is increased.

23. The method of claim 22, wherein the preset link attenuation threshold is associated with a loop length threshold.

24. The method of claim 23, wherein the loop length threshold is about 4 kilometers.

25. The method of claim 22, wherein the preset link attenuation threshold is about 36 dB.

26. The method of claim 23, further comprising:
reducing frequency bandwidth of the DSL signal on the second link from the first transceiver to the second transceiver such that a first total transmission power within a reduced frequency bandwidth keeps unchanged in comparison with a second total transmission power within an original frequency bandwidth.

27. The method of claim 23, wherein the increased PSD is less than or equal to $P_{max}-(30+10\lg(f-138))+3.5$, where
f is a cutoff frequency on the second link from the first transceiver to the second transceiver, and
$P_{max}$ is a maximal total transmission power.

28. The method of claim 23, wherein the link attenuation value of the first link is based on a DSL signal from the second transceiver during a training phase or a show time phase.

29. The method of claim 23, wherein the step of increasing, at the first transceiver, power spectral density (PSD) of a Digital Subscriber Line (DSL) signal on a second link from the first transceiver to the second transceiver comprises:
switching, at the first transceiver, from an original PSD mask to a PSD mask of ADSL2 annex L.

30. A system comprising a transceiver which is capable of being connected with an opposite transceiver via a loop, wherein the transceiver is configured to:

obtain a link attenuation value of a first link from the opposite transceiver to the transceiver;

increase a power spectral density (PSD) of a Digital Subscriber Line (DSL) signal on a second link from the transceiver to the opposite transceiver in response to determining that the link attenuation value is equal to or greater than a preset link attenuation threshold; and send a message from the transceiver to the opposite transceiver, wherein the message indicates that the PSD of the DSL signal on the second link is increased.

31. The system of claim 30, wherein the preset link attenuation threshold is associated with a loop length threshold.

* * * * *